United States Patent [19]
Janzon et al.

[11] 3,983,223
[45] Sept. 28, 1976

[54] PROCESS FOR THE PRODUCTION OF ALKALI PERCARBONATES

[75] Inventors: Karlheinz Janzon; Heinz Haschke, both of Hanau; Rudolf Müller, Freigericht, all of Germany

[73] Assignee: Deutsche Gold- und Silber-Scheideanstalt vormals Roessler, Frankfurt, Germany

[22] Filed: Dec. 12, 1974

[21] Appl. No.: 532,295

[30] Foreign Application Priority Data

Dec. 24, 1973 Germany.............................. 2364634

[52] U.S. Cl............................................. 423/415 P
[51] Int. Cl.²......................................... C01B 15/10
[58] Field of Search........................ 423/415, 415 A

[56] References Cited
UNITED STATES PATENTS 2,380,620   7/1945   Walters .......................... 423/415 P
3,883,640   5/1975   Smart ............................. 423/415 P

OTHER PUBLICATIONS

"The Condensed Chemical Dictionary," Van Nostrand Reinhold Company, New York, N. Y., 8th Ed., 1971, pp. 75 and 429.

Primary Examiner—Earl C. Thomas
Attorney, Agent, or Firm—Cushman, Darby & Cushman

[57] ABSTRACT

Alkali percarbonates are prepared from aqueous alkali carbonate and hydrogen peroxide solution in the presence of polymeric carboxylates, especially those that contain in addition to carboxylate or carboxylic groups hydroxyl groups and if desired carbonyl groups and which have an average degree of polymerization of 5 to 5000.

15 Claims, No Drawings

PROCESS FOR THE PRODUCTION OF ALKALI PERCARBONATES

Per salts of alkali metals and alkaline earth metals have wide use as active oxygen vehicles. For example, sodium perborate and sodium carbonate perhydrate (sodium percarbonate) are added as vehicles for the active oxygen bleach in powdery detergents.

It is desirable that the individual constituents of the detergent have comparable bulk density and comparable particle size in order to avoid separation of the mixture in packaging.

For example, sodium percarbonate $Na_2CO_3 \cdot 1.5 H_2O_2$ is produced by the reaction of aqueous solutions of hydrogen peroxide and sodium carbonate and products are recovered which possess the nearly theoretical content of active oxygen, namely 15.28%, see Zumbrunn, German Offenlegungsschrift No. 1,667,801. According to other processes, solid soda is sprayed with hydrogen peroxide, see schatzler, German Offenlegungsschrift No. 1,063,582.

The products produced according to these processes have the disadvantage that a high percentage of the particles have a diameter substantially smaller than that of the remaining constituents of the detergent. In order to obtain a product of suitable particle size the percarbonate produced according to the named processes must be brought to the desired particle size by a suitable subsequent treatment, see Harris, German Offenlegungsschrift No. 1,567,651, Munday, German Offenlegungsschrift No. 2,250,342 and corresponding Munday U.S. Pat. No. 3,773,678, and Kegelart German Offenlegungsschrift No. 2,250,720.

The purpose of the invention is to produce a percarbonate in an industrially simple manner by reaction of aqueous soda solution (or an aqueous potassium carbonate solution) and aqueous hydrogen peroxide which has the desired particle size of larger than 0.2 mm, namely at least in an amount of 80 weight %.

It has now been found that an alkali percarbonate with a high active oxygen content and the desired particle size of 0.2 mm in an amount of at least 80 weight % can be obtained if the reaction of the aqueous alkali carbonate and hydrogen peroxide solution is undertaken in the presence of certain polycarboxylates.

As alkali carbonate there is meant sodium carbonate and potassium carbonate. The carbonate is preferably added in pure form. However, it is also possible to use it in industrial form, after previous purification.

Above all, there are employed saturated aqueous carbonate solutions which preferably are saturated at 30°–40°C. However, there can also be used unsaturated solutions of high concentration, e.g., at least 100 grams of carbonate per liter water.

The aqueous hydrogen peroxide solutions are used in concentrations of 30 to 70 weight %, for example, preferably in a concentration of 35 to 70 weight %.

The reaction to form the percarbonates occurs during the mixing. The mixing time is generally between 10 and 30 minutes; in individual cases this can also be lengthened. In connection with the mixing the reaction mixture remains at the mixing temperature for about another 1 to 5 hours.

The polycarboxylate can be added either to the carbonate or to the hydrogen peroxide or a mixture of both of them. It is very desirable to add all three components simultaneously into the reaction vessel.

The polycarboxylates are added in amounts of 0.02 to 10 grams per mol of alkali carbonate. They can be added in solid form as well as aqueous solution (concentrations from 10 to 50 weight %). Preferably the polycarboxylate is used in an amount of 0.2–10 grams per mole of alkali carbonate.

The reactions occur at temperatures of 5° to 30°C. in customary mixing vessels, preferably at 10°–20°C.

At the end of the reaction, the mixture is cooled to the extent that the crystallization is completed. Generally, crystallization is carried out between 0° and 20°C., preferably at 0°–10°C.

The crystallized product can, if necessary, be dried, namely at customary drying temperatures of 50° to 100°C.

For use in the process of the invention, there are suited polymeric carboxylates which contain as functional groups in addition to the predominant amount of carboxyl or carboxylate groups, also hydroxyl groups and in a given case, carbonyl group (e.g., aldehydic groups). Th average degree of polymerization of the most important representatives is between 5 and 5000, preferably between 10 and 500, especially between 10 and 100. Thereby, the specifications of the average degree of polymerization are understood to mean that these values 5, 10, 100, 500 or 5,000 correspond to the reduced viscosity measured at a 1 percent solution of free poly (aldehydrocarboxylic acid) or for the poly(-hydroxycarboxylate) and poly(hydroxyaldehydocarboxylate) measured on the basis of the poly(aldehydocarboxylic acid) intermediate product of 0.033, 0.047, 0.095, 0.300 or 1.6 deciliter per gram, whereby for preparation of the 1% poly(aldehydocarboxylic acid) solutions needed for the measurement the free poly(aldehydocarboxylic acids) first are poured over with the corresponding amounts of 5% aqueous $SO_2$ solutions and, after complete solution occurs, are made up with the same volume of 10% aqueous NaCl solution. The viscosimetric measurement took place at 20°C.

These polycarboxylates are built of $Y + W/2$ basic-mole percent units of the general formula:

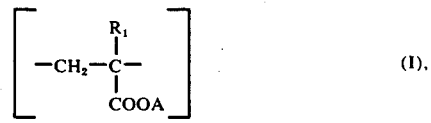

U-W basic-mole percent units of the general formula:

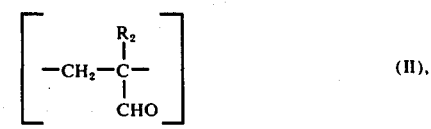

Z basic-mole percent units of the general formula:

W/2 basic-mole percent units of the general formula:

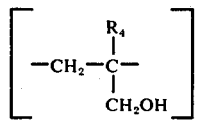

V basic mole percent units of the general formula:

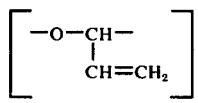

wherein:

U is 12 to 47, preferably 10 to 30;

V is 1 to 25, preferably 1 to 15, especially 1 to 10;

W is 0.6 U up to U, preferably 0.8 U up to U, especially 0.9U up to U;

Y is 100 − (U + V + Z); and

Z is 0 to 20, preferably 0 to 10, especially 0;

A is Mg/2, an alkali metal (e.g., sodium or potassium), hydrogen or ammonium and is preferably a sodium or hydrogen ion;

$R_1$ is hydrogen, methyl, hydroxymethyl, ethyl, chlorine or bromine, preferably hydrogen or hydroxymethyl;

$R_2$ and $R_4$ are the same or different and are hydrogen or hydroxymethyl;

$R_3$ and $R_5$ ar the same or different and are hydrogen, methyl or ethyl, preferably hydrogen. Preferably polycarboxylates are used for which the boundary condition is fulfilled that the quotient of the basic-mole percent of carboxyl or carboxylate groups and basic-mole percent of hydroxyl groups is between 2 and 16, preferably between 2 and 9.

The proportions of the units with general formulae (I) through (V) are given in basic-mole percents according to E. Trommstorff, i.e., as the average number of the respective formula units per total of 100 formula units (I) through (V) in the polymer molecule.

The polycarboxylates of the invention can be prepared, for example, by oxidative copolymerization of (I) acrylic acid, methacrylic acid, ethacrylic acid, chloroacrylic acid, bromoacrylic acid, 2-hydroxymethyl acrylic acid, magnesium acrylate, magnesium methacrylate, magnesium 2-hydroxymethylacrylate, sodium acrylate, potassium acrylate, sodium methacrylate, potassium methacrylate, sodium 2-hydroxymethyl acrylate, potassium 2-hydroxymethyl acrylate, sodium ethacrylate, sodium chloracrylate, potassium chloracrylate, sodium bromacrylate, potassium bromacrylate, ammonium acrylate, ammonium methacrylate, ammonium ethacrylate, ammonium 2-hydroxymethyl acrylate, ammonium chloracrylate or ammonium bromacrylate with (2) acrolein, or 2-hydroxymethyl acrolein. The preferred method of making the polycarboxylates of the invention is to copolymerize oxidatively i.e. in the presence of 0.8 to 1.0 preferably 0.8 to 0.9 moles $H_2O_2$ per mole of acrolein or substituted acrolein, (1) acrylic acid, α-chloro-acrylic acid, α-bromo-acrylicacid or methacrylic acid with (2) acrolein or methacrolein and to subject the resulting copolymers to a Cannizzaro-type reaction by recting it with alkali. f.e. aqueous solutions of caustic soda. The Cannizzaro-type reacton may also be executed in the presence of formaldehyde to give a simultaneous aldol-condensation with the formalehyde at the carbon-atoms of the polymers situated in α-position to the alehydic-groups of the polymers which are subjected to the Cannizzaro-type reaction, i.e., to form hydroxy-methylene-side-groups. The preferred comonomers for the preparation of the polycarboxylates of the invention are acrylic acid and acrolein.

The polycarboxylates A and B used in the following examples are characterized in more detail below.

Polycarboxylate A

The polycarboxylate is characterized by the following data. A poly(aldehydocarboxylic acid) solution was prepared by oxidative copolymerization of 50 mole percent of acrylic acid with 50 mole percent of acrolein in aqueous, 20 weight percent hydrogen peroxide at 70°C. (1.1 moles of acrolein per mole of $H_2O_2$; addition of the monomer mixture to the stirred hydrogen peroxide solution within 4 hours). This solution was neutralized by adding 45 weight percent of sodium hydroxide at 35°C after the distillative separation of the greater part of the residual monomers. The solution was subjected to the Cannizzaro reaction by further addition of NaOH up to a pH of 12. After neutralization of the alkaline reaction mixture with a remainder of the above given poly(aldehydrocarboxylic acid) to a pH of 7 there was obtained a 38 weight percent aqueous solution of a poly(hydroxycarbonate) which is described by the following parameters:

Y is 79 basic-mole percent;
U is 16 basic-mole percent;
V is 6 basic-mole percent;
W is 15 basic-mole percent;
Z is 0 basic-mole percent, with an average degree of polymerization (viscosity average) of $\overline{P} = 60$.

From this data there is obtained an equivalent weight (with consideration of the degree of neutralization as is present with regulation to a pH of 7, of 0.88 and with consideration of the analytically determinable end groups) of: 101.5.

Polycarboxylate B

The polycarboxylate is characterized by the following data. A poly(aldehydocarboxylic acid) solution was prepared by oxidative copolymerization of 16 mole percent acrylic acid with 84 mole percent of acrolein in aqueous, 20 weight percent hydrogen peroxide at 70°C. (1.1 moles of acrolein per mole of $H_2O_2$; addition of the monomer mixture to the stirred hydrogen peroxide solution within 4 hours). This solution was neutralized by adding 40 weight percent of sodium hydroxide at 35°C. after the distillative separation of the greater part of the residual monomers. The solution was subjected to the Cannizzaro reaction by further addition of NaOH up to a pH of 12. After neutralization of the alkaline reaction mixture with a remainder of the above given poly(aldehydocarboxylic acid) to a pH of 7 there was obtained a 36 weight percent aqueous solution of a poly(hydroxycarboxylate) which is described by the following parameters:

Y is 67 basic-mole percent;
U is 22 basic-mole percent;
V is 11 basic-mole percent;
W is 20 basic-mole percent;
Z is 0 basic-mole percent, with an average degree of polymerization (viscosity average) of $\overline{P} = 12$.

From this data there is obtained an equivalent weight of the poly(hydroxycarboxylic acid sodium salt) (with consideration of the degree of neutralization, as is present by regulation to a pH of 7, of 0.88 and with consideration of the analytically determinable end groups) of 111.2.

EXAMPLES 1–6

530 grams of $NaCO_3$ were dissolved in 1,250 ml of water at 38° to 40°C. and to the solution there was added each of the amounts of the polycarboxylate A set forth in Table 1. This solution was mixed with 885 grams of a 35% aqueous solution of hydrogen peroxide which contained 30 grams of $MgSO_4 \cdot 7 H_2O$ dissolved therein and the mixture was slowly cooled with stirring to about 8°C. After 3 hours the crystalline percarbonate was separated from the mother liquor and dried. The properties of the product are given in Table 1. ($O_A$ in all tables means "active oxygen content").

EXAMPLES 7–9

In a vessel provided with a stirrer that could be cooled by a bath there were cooled 100 ml of water to 5°C. Into this there were simultaneously added a 40°C. warm solution of 530 grams of soda and the amounts of polycarboxylate B given in Table 2 in 1,250 ml of water and 300 ml of 70% aqueous $H_2O_2$ which contained 25 grams of $MgSO_4 \cdot 7 H_2O$, so dosaged that the addition was ended after 25 minutes. The crystal slurry formed was stirred for 4 hours and subsequently the product separated from the mother liquor and dried. The properties are given in Table 2.

EXAMPLES 10–16

530 grams of soda were dissolved in 1,250 ml of water at 38°C. and there were added to the solution the amounts given in Table 3 of a sodium-magnesium polyhydroxycarboxylate (corresponding to polycarboxylate A but one-third of the negative valences neutralized by Na and two-thirds by Mg). This solution was allowed to go into 885 grams of 35% aqueous $H_2O_2$ with constant stirring inside of 20 minutes. The mixture was cooled inside one hour to 7°C. and after a further two hours the crystals isolated and dried. The active oxygen content and sieve analysis are given in Table 3.

EXAMPLE 17

In a circulating solution of 256 grams of sodium carbonate in 2 liters of water cooled to 10°C. which contained 20 grams of Na-Mg-poly(hydroxycarboxylate) of Examples 10–16, there were pumped in in the course of 30 minutes simultaneously a solution of 1,590 grams of sodium carbonate and 15 grams of the Na-Mg-poly(-hydroxycarboxylate) in 3,750 ml of water and 850 ml of 70% aqueous $H_2O_2$ containing 25 grams of $MgSO_4 \cdot 7 H_2O$. By cooling a temperature of about 7°C. was maintained. After 2.5 hours, the depositing crystal slurry was separated from the mother liquor and dried in a fluidized bed drier with warm air at 50°C. There were recovered 1,564 grams of sodium percarbonate having an active oxygen content of 14.5% and the following particle distribution:

| Residue on: | | |
|---|---|---|
| | 1.6 mm sieve | 8% |
| | 0.8 mm sieve | 20% |
| | 0.4 mm sieve | 46% |
| | 0.2 mm sieve | 83% |
| | 0.1 mm sieve | 98% |
| | <0.1 mm sieve | 2% |

EXAMPLE 18

The procedure of Example 17 was followed but instead of 850 ml of 70% $H_2O_2$ there were added 900 ml of the 70% $H_2O_2$ and there were recovered 1,590 grams of a percarbonate having 14.75% active oxygen and the following particle distribution:

| Residue on: | | |
|---|---|---|
| | 1.6 mm sieve | 10% |
| | 0.8 mm sieve | 22% |
| | 0.4 mm sieve | 40% |
| | 0.2 mm sieve | 95% |
| | 0.1 mm sieve | 99% |
| | <0.1 mm sieve | 1% |

Table 1

| Example No. | Polyhydroxy-carboxylate/g | Active Oxygen Content, $O_A$% | Sieve Residue in Weight % | | | | | | Stability in Solution Residual $O_A$(%) |
|---|---|---|---|---|---|---|---|---|---|
| | | | 1.0 mm | 0.6 | 0.3 | 0.2 | 0.1 | <0.1 | |
| 1 | 0 | 15.1 | 0 | 0 | 2 | 7 | 70 | 30 | 40 |
| 2 | 3.2 | 14.9 | 2 | 19 | 56 | 78 | 96 | 4 | 32 |
| 3 | 4.0 | 14.9 | 14 | 39 | 90 | 96 | 99 | 1 | 35 |
| 4 | 5.3 | 14.8 | 20 | 43 | 88 | 97 | 99 | 1 | 66 |
| 5 | 6.4 | 14.8 | 0 | 36 | 65 | 91 | 97 | 3 | 34 |
| 6 | 7.6 | 14.9 | 0 | 30 | 57 | 88 | 96 | 4 | 43 |

Table 2

| Example No. | Polyhydroxy-carboxylate/g | Active Oxygen Content, $O_A$ % | Sieve Residue in Weight % | | | | Stability in Solution Residual $O_A$% |
|---|---|---|---|---|---|---|---|
| | | | 0.6 mm | 0.3 | 0.15 | <0.15 | |
| 7 | 4 | 14.5 | 8 | 17 | 45 | 55 | 34 |
| 8 | 8 | 14.8 | 8 | 65 | 95 | 5 | 40 |
| 9 | 10 | 14.7 | 7 | 57 | 93 | 7 | 40 |

Table 3

| Example No. | Polyhydroxy-carboxylate/g | Active Oxygen Content $O_A\%$ | Sieve Residue In Weight % | | | | Stability in Solution Residual $O_A\%$ |
|---|---|---|---|---|---|---|---|
| | | | 0.6 mm | 0.3 | 0.15 | <0.15 | |
| 10 | 0 | 15.0 | 1 | 2 | 9 | 91 | 45 |
| 11 | 0.2 | 15.1 | 0 | 1 | 42 | 58 | 37 |
| 12 | 0.4 | 15.0 | 0 | 12 | 71 | 29 | 36 |
| 13 | 1.0 | 15.0 | 11 | 41 | 90 | 10 | 32 |
| 14 | 2.0 | 15.0 | 6 | 59 | 90 | 10 | 39 |
| 15 | 3.0 | 14.9 | 27 | 63 | 91 | 9 | 37 |
| 16 | 4.0 | 14.9 | 28 | 62 | 92 | 8 | 51 |

The stability in solution for all three tables was determined in the following manner:

2 grams of percarbonate were dissolved in the cold in 50 ml of distilled water. The solution was placed in a thermostatically controlled bath at 60°C. and left there for 2 hours. Then the residual content of $O_A$ was determined and set forth in relation to the starting content.

The percarbonates obtained according to the invention have particle sizes which preferably in an amount of 40 to 60% lie between 0.2 and 0.6 mm. The bulk density (apparent density) has a value between 0.7 and 0.9 g/cm³. These products are obtained in an industrially simple manner.

The process can comprise, consist of or consist essentially of the steps set forth and using the materials set forth.

What is claimed is:

1. In the process of preparing an alkali metal percarbonate from aqueous alkali carbonate and hydrogen peroxide solution and crystalizing the percarbonate thus formed, the improvement comprising carrying out the reaction of the components in the presence of a polymeric carboxylate which is built of the following units:

Y + W/2 basic-mole percent units of the general formula:

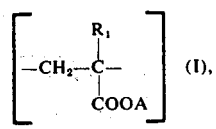 (I),

U-W basic-mole percent units of the general formula:

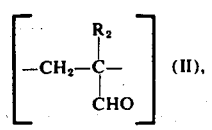 (II),

Z basic-mole percent units of the general formula:

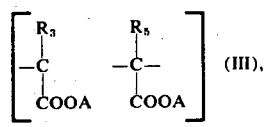 (III),

W/2 basic-mole percent units of the general formula:

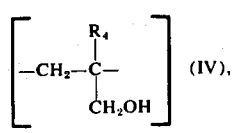 (IV),

V basic-mole percent units of the general formula:

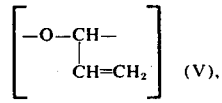 (V), wherein:
U is 12 to 47,
V is 1 to 25,
W is 0.6U to U,
Y is 100 - (U + V + Z) and
Z is 0 to 20,
A is Mg/2, an alkali metal, hydrogen or ammonium ion,
$R_1$ is hydrogen, methyl, hydroxymethyl, ethyl, chlorine or bromine,
$R_2$ and $R_4$ are hydrogen or hydroxymethyl, and
$R_3$ and $R_5$ are hydrogen, methyl or ethyl.

2. The process of claim 1 wherein 0.02 to 10 grams of polymeric carboxylate are added per mole of alkali carbonate.

3. The process of claim 2 wherein the percarbonate is formed at 5° to 30°C. and the crystallization is carried out at 0° to 20°C.

4. The process of claim 2 wherein the average degree of polymerization is between 5 and 5,000.

5. The process of claim 4 wherein U is between 10 and 30, V is between 1 and 15, W is between 0.8U and U, Z is 0 to 10.

6. The process of claim 5 wherein A is sodium or hydrogen.

7. The process of claim 6 wherein V is 1 to 15, W is 0.9U to U and Z is 0.

8. The process of claim 2 wherein $R_1$, $R_2$, $R_3$, $R_4$ and $R_5$ are all hydrogen.

9. The process of claim 8 wherein Z is O and A is sodium, hydrogen or Mg/2.

10. The process of claim 9 wherein the average degree of polymerization is between 5 and 5,000.

11. The process of claim 10 wherein the average degree of polymerization is 10 to 500.

12. The process of claim 11 wherein the percarbonate is formed at 5° to 30°C. and the crystallization is carried out at 0° to 20°C.

13. The process of claim 12 wherein the alkali metal percarbonate is sodium percarbonate.

14. The process of claim 1 wherein the polymeric carboxylate is formed by oxidizing (1) acrylic acid, α-chloroacrylic acid, α-bromo-acrylic acid or methacrylic acid with (2) acrolein or methacrolein with 0.8 to 1.0 moles of $H_2O_2$ per mole of acrolein or methacrolein followed by either (1) a Cannizzaro reaction of the resulting polymer with alkali or (2) a Cannizzaro reaction of the resulting polymer with alkali in the presence of formaldehyde.

15. The process of claim 14 wherein the $H_2O_2$ is 0.8 to 0.9 mole per mole of acrolein or methacrolein.

* * * * *